F. BRAUNBECK.
PROCESS OF COMPLETELY OPENING OR DISINTEGRATING GRAINS AND LEGUMES.
APPLICATION FILED MAY 31, 1906.
1,011,730. Patented Dec. 12, 1911.
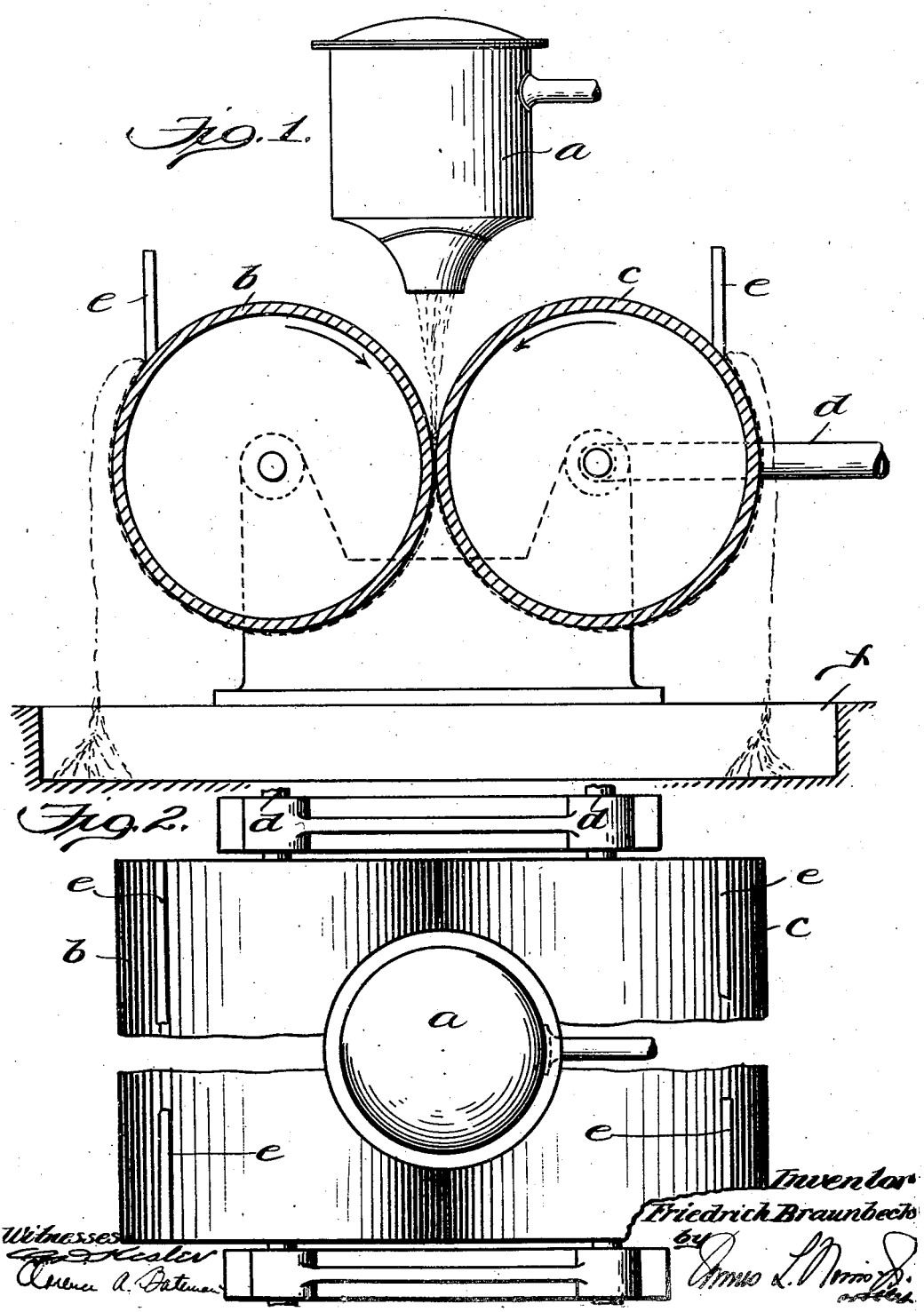

UNITED STATES PATENT OFFICE.

FRIEDRICH BRAUNBECK, OF BERLIN, GERMANY.

PROCESS OF COMPLETELY OPENING OR DISINTEGRATING GRAINS AND LEGUMES.

1,011,730.  Specification of Letters Patent.  Patented Dec. 12, 1911.

Application filed May 31, 1906. Serial No. 319,509.

*To all whom it may concern:*

Be it known that I, FRIEDRICH BRAUNBECK, a subject of the King of Wurttemberg, residing at Berlin, in the Kingdom of Prussia and German Empire, have invented new and useful Improvements in Processes of Completely Opening or Disintegrating Grains and Legumes, of which the following is a specification.

According to the processes heretofore employed to disintegrate grains and legumes, the disintegration of the fruit was only carried to a certain point but not completed. The reason for this is that the cells in the cooking or steaming process were only swollen but not destroyed. Attempts have also been made to disintegrate grain and the like by again roasting or baking the flour obtained from partially disintegrated grain and by then again reducing this product to flour. No process however has heretofore been used, according to which the grain is first cooked to a pulp, which is then completely disintegrated by being passed between hot rollers, so that the flakes falling from the rollers yield a perfectly disintegrated flour. A so perfectly disintegrated flour is not yet on the market.

The present process differs from all those hitherto employed, more or less by the fact that a pulp is formed by so boiling and crushing the grain or legumes that the cells are completely destroyed. This pulp, which is nearly completely disintegrated, is fed between hot rollers arranged very close together. Said rollers are highly heated and complete the disintegrating process. The product leaves the rollers in the form of perfectly disintegrated flakes, which are then reduced to flour in a milling process, a completely disintegrated flour being obtained, which swells and immediately absorbs a great quantity of water when brought into contact therewith. With this flour, puddings, etc., can be more quickly prepared than heretofore, which is of great importance for military and also for general purposes.

In carrying out the present invention grain, such as rye, wheat, barley, oats, rice, maize, etc., or legumes, such as peas, beans, lentils, etc., are subjected to a steaming and cooking process of such intensity that the form of the cells is entirely destroyed. This steaming and cooking process is preferably carried out in the presence of water, and stirring or crushing agents may be simultaneously employed, in order to convert the grain into a pulp. In this mass the fruit is almost entirely, and, in any case, more than in the older methods, disintegrated. This pulp is then fed direct from the boiling pots between rollers which are arranged close together and heated to 100–200° C, in order to remove both the liquid in the fruit and that introduced by the steaming and cooking process. By the rollers the pulp is dried in a thin layer in a very short time, in a fraction of a minute and is scraped off in the form of extremely fine flakes, which are then reduced to flour. This flour is entirely disintegrated and has properties not heretofore attained.

Processes are known, in which vegetable products are dried on hot rollers. The present process however does not relate only to the drying, but to the production of a perfectly opened or disintegrated dry flour. For this purpose the grain or other fruit must be first converted into a pulp by boiling or steaming, which pulp is then very quickly led over highly heated rotating rollers or drums, on which it is dried in a few seconds in order to obtain not only a perfectly dry flour but also to perfectly disintegrate or open, in other words, to destroy, the structure of the cells of the vegetable product, as is not done according to any other process either by boiling or steaming alone or under pressure or by drying on slowly rotating not so highly heated rollers.

By completely destroying the cell form, according to the present invention, and by forming a pulp, the fruit is almost entirely disintegrated, which was not the case with the processes heretofore known. Especially by them immediately removing the water and further drying the pulp by highly heated rollers arranged close together, a product is obtained in the form of flakes which in view of the special properties brought forth by the process, may be said to be entirely disintegrated. The treatment in the rollers is therefore to be regarded as the completion of the disintegrating process. The subsequent reduction of the flakes to flour is done in any known manner.

Compared with heretofore existing processes the present invention has the advantage of increased simplicity, because the separate steps follow each other immediately. It has further the advantage that the fruit is disintegrated to a degree not heretofore attained.

An apparatus which can be employed for carrying out the invention is shown in the accompanying drawing, wherein—

Figure 1 is a sectional view, and Fig. 2 a plan view of the apparatus.

Referring to the drawing $a$ is a receiver in which the grain or the like is steamed or cooked until it is reduced to a pulp, and $b$ and $c$ rolls which are heated by steam admitted thereto by pipes $d$. The pulp is delivered to the rolls from the receiver and adheres to the same in the form of thin layers which are removed by the scrapers $e$ and fall into the receptacle $f$.

There is a known process of opening pumpkins and sweet-potatoes with steam, to then mix them with material containing starch, and to carry the resulting pulp over rolls heated with steam in order to produce a dry powder. In such process, however, the starch cells are not opened previous to the passage of the pulp over the heated rolls, but on the contrary, such opening of the starch cells shall only take place with the drying of the paste consisting of a mixture of unopened pumpkin flour and unopened starch bodies upon the rolls heated by steam. The consequence of this is that such a thin paste does not yield a completely opened powder, and if it should be attempted to open the starch kernels during the drying on the rolls, a powder would be produced which has suffered through the prolonged influence of the temperature of the rolls, that is, the powder will become brown and contains dextrin. According to applicant's process, however, the cells of the materials containing starch are burst previous to the drying thereof by the rolls because of the heating of the starch pulp to a high temperature and in some cases, under pressure. The present process, therefore, renders it possible to dry the pulp in a very short time and in fact a subsequent complete opening is not required. Such a rapid drying, however, can be effected through the use of a relatively high temperature (120° to 200° C.) and it has been found that by using such a temperature, only a few seconds exposure is sufficient to convert the layer of thin paste into a dry powder.

What I claim and desire to secure by Letters Patent of the United States is:

1. The herein described process of producing a dry flour from grains and legumes which consists in heating the same in the presence of moisture to a temperature and for a period of time sufficient to open the starch cells thereof and form a paste, and then immediately subjecting such paste in the form of a thin film to the action of heat at a temperature ranging between 120° and 200° C. for a momentary period just sufficient to completely disintegrate the cell structure of the material forming the paste and to dry the paste.

2. The herein described process of producing a dry flour from grains and legumes which consists in boiling the grains or legumes in water or steam until the starch cells of the same are burst open and form a paste, next passing the paste in the form of a thin film very quickly between closely arranged revolving rollers heated to a temperature ranging between 120° and 200° C., and then immediately removing the resulting material from such rollers after the paste has been in contact therewith for a period just sufficient to convert the film of paste into a dry substance.

In witness whereof I have hereunto signed my name this 14th day of May in the presence of two subscribing witnesses.

FRIEDRICH BRAUNBECK.

Witnesses:
HENRY HASPER,
WOLDEMAR HAUPT.